Jan. 26, 1932.   U. A. WHITAKER   1,842,487
BRAKE AND DOOR CONTROL DEVICE
Filed Nov. 16, 1929
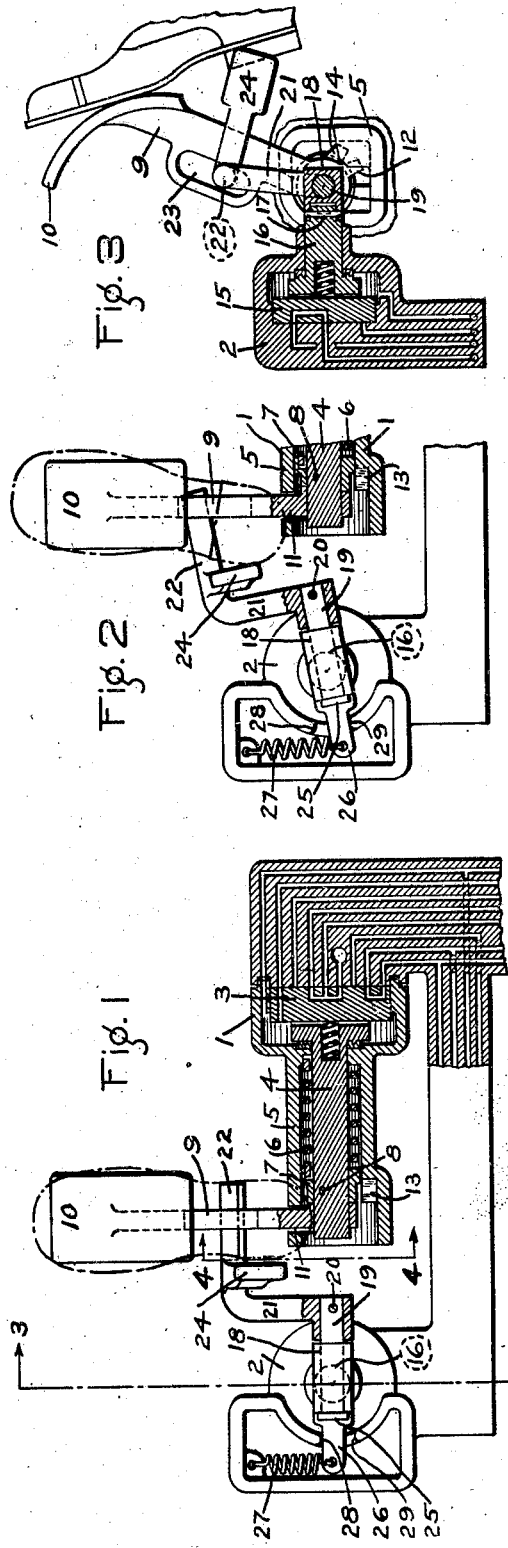
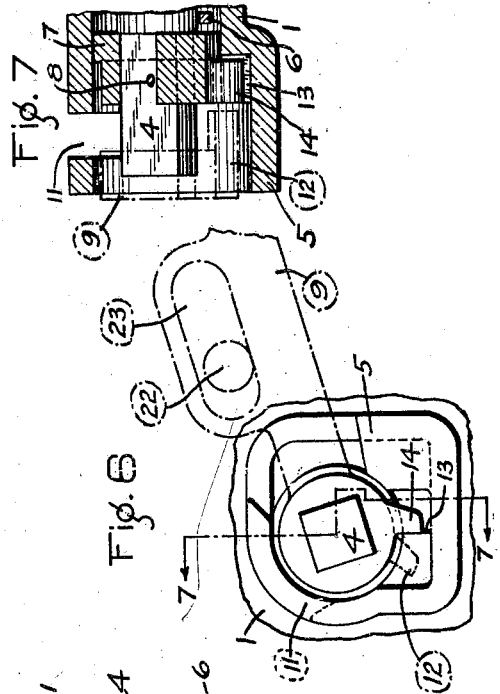
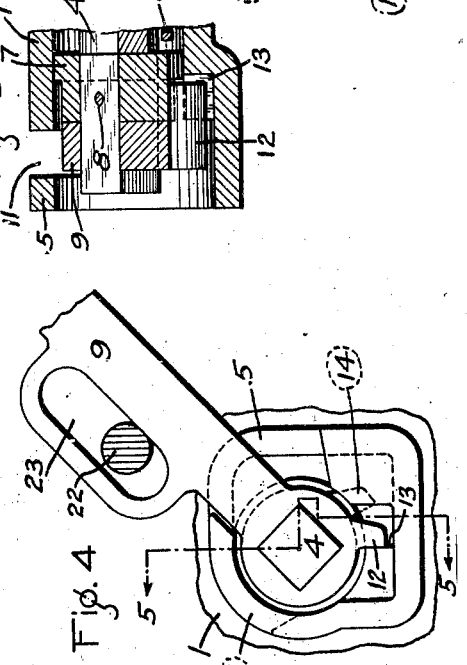
INVENTOR
UNCAS A. WHITAKER
BY *Wm. W. Cady*
ATTORNEY Patented Jan. 26, 1932

1,842,487

UNITED STATES PATENT OFFICE

UNCAS A. WHITAKER, OF CANTON, OHIO, ASSIGNOR TO THE WESTINGHOUSE AIR BRAKE COMPANY, OF WILMERDING, PENNSYLVANIA, A CORPORATION OF PENNSYLVANIA

BRAKE AND DOOR CONTROL DEVICE

Application filed November 16, 1929. Serial No. 407,605.

This invention relates to control devices, and has for its principal object, the provision of an improved mechanism adapted to be controlled by one foot of an operator for controlling the operation of a plurality of control valve devices, such as, for instance, the brake and door controlling valve devices of a vehicle which devices are usually operated by hand.

Another object of the invention is to provide a novel foot pedal mechanism whereby an operator, by the use of one foot, may control the independent operation of each of a plurality of control valve devices.

Another object of the invention is to provide a foot controlled mechanism comprising a plurality of foot pedals whereby an operator, by the use of one foot, may control the independent operation of each of a plurality of control valve devices, and a further object is to connect the foot pedals in such a manner that they may, at all times, be engaged by the operator's foot.

Other objects and advantages will appear in the following more detailed description of the invention.

In the accompanying drawings; Figure 1 is an elevational view, partly in section, of a foot controlled mechanism embodying my invention and particularly adapted for controlling the operation of a brake valve device and a door controlling valve device, the brake valve device being shown in release position and the door controlling valve device in door closed position; Fig. 2 is a fragmentary elevational view illustrating the manner of operating the mechanism to control the opening of a door or doors of a vehicle; Fig. 3 is a sectional view taken on the line 3—3 of Fig. 1, the operator's shoe being shown in full lines; Fig. 4 is an enlarged fragmentary sectional view taken on the line 4—4 of Fig. 1, the mechanism being shown in foot off position; Fig. 5 is a sectional view taken on the line 5—5 of Fig. 4; Fig 6 is a view like Fig. 5 except that the mechanism is shown in pedal off position, the operating pedals being shown in dot and dash lines to illustrate how the brake valve operating pedal is removed; and Fig. 7 is a sectional view taken on the line 7—7 of Fig. 6.

In the drawings my improved foot controlled mechanism is illustrated in connection with a brake valve device 1 and a door controlling valve device 2 which are especially adapted for use in a safety car control equipment, but it is to be understood that this mechanism may be used in any other equipment where it is desired to have an operator control the operation of a plurality of control valve devices, by the use of one foot.

The brake valve device may comprise a casing containing a rotary valve 3 having any desired arrangement of ports and cavities for controlling the brakes of a vehicle. This valve 3 is provided with an operating stem 4 which is arranged within a hollow extension 5 of the casing and is suitably journalled in the casing. Within the hollow extension 5, and surrounding the operating stem 4, is a torsion spring 6 having its inner end anchored to the casing and its outer end anchored to a collar 7 secured to the operating stem by a pin 8. This spring is preferably under initial torsion so that, at all times, it tends to rotate the operating stem in a clockwise direction.

The outer end portion of the operating stem 4 is made square and upon this portion, an operating lever or pedal 9, hereinafter called the toe pedal, is removably mounted, which pedal, at its outer end is provided with a toe pad 10 adapted to be engaged by the front portion of the sole of the operator's shoe.

In safety car control equipment it is desirable that the brake valve device have a pedal off position as shown in Figs. 6 and 7 of the drawings, a foot off position as shown in Figs. 4 and 5, a release and running position as shown in Figs. 1 and 3, a service position and an emergency position. The brake valve device is operated to service and emergency positions by the forward movement of the toe pedal from running and release position.

The hollow projection 5, adjacent its outer end, is provided with an open ended slot 11 which is adapted to receive the arm of the toe pedal 9 when the pedal is operated forward to release and running or any other forward position, thus preventing the removal of the toe pedal from the stem 4 when the pedal is in any of the positions just mentioned.

If at any time and for any reason the operator should desire to remove the toe pedal 9 from the stem 4, he removes his foot from the pedal, permitting the power of the torsion spring 6 to rotate the stem 4, rotary valve 3 and toe pedal in a clockwise direction until a lug 12 engages a stop 13 rigid with the extension 5 of the casing, at which time the arm of the pedal will be wholly outside of the slot 11 in the casing.

In safety car control equipment, an application of the brake, preferably an emergency application, will be effected when the toe pedal 9 is operated to foot off position, thus insuring the stopping of the car before the pedal is removed.

After the lug 12 on the toe pedal 9 engages the lug 13 on the casing, the operator moves the pedal 9 outwardly along the square end of the stem 4 until the lug 12, on the pedal, is free of the stop 13, when the power of the torsion spring causes the stem 4, rotary valve and lever 9 to further rotate in a clockwise direction, such movement being stopped by a lug 14 on the collar 7 engaging the stop 13 on the casing. When the lug 14 engages the stop 13, the brake valve device 1 will be in pedal off position in which the brakes are maintained applied. It will thus be seen that after the pedal is in foot off position it is readily removable from the stem 4.

In applying the toe pedal 9, it is first placed on the stem 4 as shown in Figs. 6 and 7 and then operated forward to foot off position and in this position is moved inwardly along the stem 4 until the lug 12 is in proper engagement with the stop 13 of the casing, as shown in Figs. 4 and 5, when the pedal may again be operated to control the operation of the brake valve device 1. When the pedal is moved from pedal off position to foot off position the lug 14 is moved free of the stop 13 so that this lug 14 does not, in any way, interfere with the movement of the lug 12 into engagement with the stop 13.

The door controlling valve device may comprise a casing containing a rotary valve 15 having any desired arrangement of ports and cavities for the proper control of the door or doors of the vehicle. For the purpose of operating this rotary valve an operating stem 16 is provided which stem is rotatably mounted in the casing, the axis of rotation of this stem being at an angle to the axis of rotation of the stem 4 of the brake valve device.

Secured to the outer end of the stem 16, by a pin 17, is an operating member having a sleeve portion 18 in which a pin 19 is rotatably mounted. This pin extends through the sleeve portion, and beyond the forward end of the sleeve portion, has secured thereto, by a pin 20, an arm 21 of an operating lever, hereinafter called the heel pedal, said heel pedal also having an arm 22 extending at an angle to the arm 21. The outer end portion of the arm 22 extends into a slotted opening 23 formed in the arm of the toe pedal 9 and is adapted to be operatively engaged by the toe pedal.

Preferably integral with the arm 22, and projecting rearwardly therefrom, is a heel pad 24 which is adapted to be engaged by the side of the operator's heel, while the forward portion of his foot is in engagement with the toe pad 10 of the toe pedal 9.

The arm 21 is adapted to engage one end of the sleeve portion 18 and a head 25 of the pin is adapted to engage the opposite end of the sleeve portion so that the head 25 and arm 21 prevent undue movement of the pin 19 in the directions of its length.

Preferably integral with the sleeve portion 18, and extending outwardly therefrom, is an arm 26 to which one end of an operating spring 27 is attached, the other end of the spring being attached to the casing. This spring tends, at all times, to maintain the door controlling valve device in door closed position in which the arm 26 engages a stop 28 on the casing as shown in Fig. 1. The door opening movement of the door control valve device being limited by the arm 26 engaging a stop 29 on the casing as shown in Fig. 2.

In operation the toe pedal 9 is operated back and forth to control the operation of the valve device 1 and by reason of the engagement of the toe pedal with the arm 22 within the slotted opening 23, the heel pedal will be caused to move in the same directions, but such movement will not cause the operation of the valve device 2 since the pin will rotate freely in the sleeve 18. It will thus be noted that as the toe pedal 9 is operated the heel pedal will be maintained in the proper position to be operated by the operator's heel.

When the operator desires to operate the valve device 2, he moves his heel sidewise, operating the heel pedal, through the medium of the heel pad 24, in the same direction, imparting a rotary movement to the sleeve portion 18 of the operating member, operating stem 16 and rotary valve 15, against the power of the spring 27, until such time as the arm 26 engages the stop 29, when the valve device 2 will be in door open position. The operation of the valve device 2 to door open position is shown in Fig. 2.

When it is desired to close the vehicle door, the operator relieves his heel pressure from the heel pad 24 of the heel pedal and the power of the spring 27 acting through the arm 26 returns the heel pedal and rotary valve to their normal positions as shown in Figs. 1 and 3.

Between the end of the hollow extension 5 of the casing and the heel pad 24 of the heel pedal there is sufficient clearance provided to permit the removal of the toe pedal from the stem 4 of the valve device 1.

It will be seen from the foregoing description that I have provided a control mechanism whereby an operator may, by the use of one foot, control the independent operation of each of a plurality of rotary valve devices and in which the foot pedals are, at all times, maintained in positions to be engaged by the operator's foot.

While one illustrative embodiment of the invention has been described in detail, it is not the intention to limit its scope to that embodiment or otherwise than by the terms of the appended claims.

Having now described my invention, what I claim as new and desire to secure by Letters Patent, is:—

1. In a control mechanism, the combination with two control valve devices, of an element operative in certain directions and controlled by the toe portion of one foot of an operator for controlling the operation of one of said valve devices, and an element operative in directions different from the directions of operation of the first mentioned element and controlled by the heel portion of the same foot of the operator for controlling the operation of the other of said valve devices.

2. In a control mechanism, the combination with two control valve devices, of an element operative in certain directions and controlled by the toe portion of one foot of an operator for controlling the operation of one of said valve devices, and an element operative in directions different from the directions of operation of the first mentioned element and controlled by the heel portion of the same foot of the operator for controlling the operation of the other of said valve devices, the second mentioned element being movable by the first mentioned element for at all times maintaining the relationship between said elements such that both elements are adapted to be engaged by the foot of the operator.

3. In a control mechanism, the combination with two control valve devices, of a toe pedal operative forwardly and backwardly for controlling the operation of one of said valve devices, and a heel pedal operative by said toe pedal for maintaining the heel pedal in operative position relative to the toe pedal and operative transversely and independently of the toe pedal for controlling the operation of the other of said valve devices.

4. In a control mechanism, the combination with two control valve devices, of a toe pedal for controlling the operation of one of said valve devices, and a heel pedal movable by said toe pedal for maintaining the heel pedal in operative position relative to the toe pedal and operative in directions at an angle to the direction of operation of the toe pedal for controlling the operation of the other of said valve devices.

5. In a vehicle brake and door controlling mechanism, the combination with a brake valve device and a door controlling valve device, of a toe pedal for controlling the operation of said brake valve device, a heel pedal adapted to be operated by said toe pedal for maintaining the heel pedal in operative position relative to the toe pedal and operative independently of the toe pedal for controlling the operation of said door controlling valve device, and a connection between said heel pedal and door controlling valve device adapted to permit said heel pedal to operate with the toe pedal without operating the door control valve device.

6. In a vehicle brake and door controlling mechanism, the combination with a brake valve device and a door controlling valve device, of a toe pedal controlled by the forward pressure of an operator's foot for controlling the operation of said brake valve device, and a heel pedal controlled by the sidewise pressure of the same foot of the operator for controlling the operation of said door controlling valve device, said pedals being operatively connected together for maintaining the heel pedal in position to be operated by the operator's foot when said toe pedal is operated.

7. In a vehicle brake and door controlling mechanism, the combination with a brake valve device and a door controlling valve device, of a toe pedal controlled by the forward pressure of an operator's foot for controlling the operation of said brake valve device, a heel pedal controlled by the sidewise pressure of the same foot of the operator for controlling the operation of said door controlling valve device and operative by the toe pedal, without operating the door controlling valve device, for maintaining the heel pedal in operative position relative to the toe pedal.

8. In a vehicle brake and door controlling mechanism, the combination with a brake valve device, of a toe pedal subject to the forward pressure of a foot of an operator for controlling the operation of said brake valve device, a door controlling valve device, a heel pedal for controlling the operation of said door controlling valve device operative by said toe pedal without operating the door controlling valve device and subject to the sidewise pressure of the operator's foot for controlling the operation of the door controlling valve device.

9. In a vehicle brake and door controlling mechanism, the combination with a brake valve device, of a toe pedal subject to the forward pressure of a foot of an operator for controlling the operation of said brake valve device, a door controlling valve device comprising an operating stem, a heel pedal for controlling the operation of said stem and operatively connected with said toe pedal, and means connecting said heel pedal and stem adapted to provide a lost motion connection between the heel pedal and stem when the heel pedal is operated by the toe pedal and adapted to provide a positive connection when the heel pedal is subject to the sidewise pressure of the operator's foot.

10. In a vehicle brake and door controlling mechanism, the combination with a brake valve device, of a toe pedal subject to the forward pressure of a foot of an operator for controlling the operation of said brake valve device, a door controlling valve device comprising an operating stem, a heel pedal for controlling the operation of said stem and operatively connected with said toe pedal for maintaining the heel pedal in operative position relative to the toe pedal, and means connecting said heel pedal and stem adapted to provide a lost motion connection between the heel pedal and stem to permit the heel pedal to operate with the toe pedal without operating the door controlling valve device and to provide a positive connection between the heel pedal and stem for operating the door controlling valve device when the heel pedal is subject to the sidewise pressure of the operator's foot.

11. In a control mechanism, the combination with two rotary control valves, each of said valves being rotatable in a plane at an angle to the plane of rotation of the other, and foot pedals for controlling the operation of said valves adapted at all times to be engaged by one foot of an operator, one of said pedals being movable in one plane only for controlling the operation of one of said valves and the other of said pedals being operative with the first mentioned pedal for maintaining said other pedal in position to be engaged by the operator's foot and being operative in a different direction and relative to the first mentioned pedal for controlling the operation of the other of said valves.

12. In a control mechanism, the combination with two rotary control valves, each of said valves being rotatable in a plane at an angle to the plane of rotation of the other, a toe pedal for controlling the operation of one of said valves, and a heel pedal for controlling the operation of the other of said valves, said pedals being initially arranged to be respectively engaged by the toe and heel of one foot of an operator, the toe pedal being operative in one plane only to control the operation of one of said valves and the heel pedal being movable with the toe pedal for maintaining the initial relationship of said pedals and operative in a different direction to the direction of operation of the toe pedal for controlling the operation of the other of said valves.

In testimony whereof I have hereunto set my hand, this 12th day of November, 1929.

UNCAS A. WHITAKER.